United States Patent Office 3,850,977
Patented Nov. 26, 1974

3,850,977
3-SUBSTITUTED-BENZYL CYCLOPROPANE-CARBOXYLATES
Nobushige Itaya, Minoo, Toshio Mizutani, Hirakota, Shigeyoshi Kitamura, Toyonaka, Nobuyuki Kameda, Takarazuka, Keimei Fujimoto, Kyoto, and Yositosi Okuno, Toyonaka, Japan, assignors to Sumitomo Chemical Company, Ltd., Osaka, Japan
No Drawing. Continuation of abandoned application Ser. No. 827,886, May 26, 1969. This application Oct. 21, 1971, Ser. No. 191,539
Claims priority, application Japan, June 6, 1968, 43/40,767, 43/40,769
Int. Cl. C07c 69/74, 69/76
U.S. Cl. 260—468 H      5 Claims

ABSTRACT OF THE DISCLOSURE

New 3-substituted-benzyl cyclopropanecarboxylates having excellent insecticidal activity and harmless property to mammals and cattle, represented by the formula,

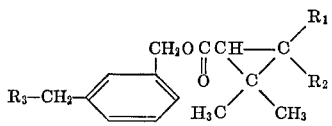

wherein $R_1$ is a hydrogen atom or a methyl group; $R_2$ is methyl, 2-methyl-1-propenyl, 2-methoxycarbonyl-1-propenyl, phenyl or 3,4-methylenedioxyphenyl group when $R_1$ is a hydrogen atom, or methyl group when $R_1$ is a methyl group; $R_3$ is a phenyl group or a heterocyclic ring both of which may be substituted with a chlorine atom or a methyl group, whose carboxylates are prepared by esterifying the derivatives of corresponding 3-substituted-benzyl compounds with the carboxylic acids or their derivatives.

This is a continuation of application Ser. No. 827,886, filed May 26, 1969, and now abandoned.

The present invention relates to novel carboxylic acid esters, and more particularly to new 3-substituted-benzyl cyclopropanecarboxylates having insecticidal activities and a method for the production thereof. The present invention further relates to insecticidal compositions containing said novel esters.

PRIOR ART

As an insecticide having insect-knock-down and killing ability as well as harmless property to mammals and cattle, there have been hitherto used pyrethrum extracts including pyrethrin, and is sold on market recently a synthetic insecticide such as allethrin which is a homologue of pyrethrin and 3,4,5,6-tetrahydrophthalimidomethyl chrystanthemate (referred to "tetramethrin" hereinafter). However, none of them satisfies at present time all of the desired conditions, showing drawback in same points and advantage in the other.

After studing to obtain new effective esters, the inventors have found a new type ester which is remarkably excellent in insecticidal activity as compared with the above pyrethrin and its homologue and is prepared at low costs. Thus, the present invention is achieved.

OBJECT

An object of the present invention is to provide a new cheap carboxylic acid ester showing more excellent insecticidal activity.

CHEMICAL COMPOUNDS

According to the present invention, a novel cyclopropanecarboxylic acid ester is provided, said ester having the following formula,

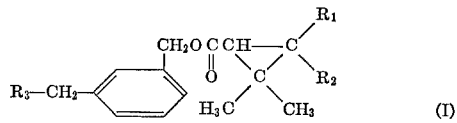   (I)

wherein $R_1$ is a hydrogen atom or a methyl group; $R_2$ is a methyl, 2-methyl-1-propenyl, 2-methoxycarbonyl-1-propenyl, phenyl or 3,4-methylenedioxyphenyl group when $R_1$ is a hydrogen atom, or a methyl group when $R_1$ is a methyl group; $R_3$ is a phenyl group or a heterocyclic ring both of which may be substituted with a chlorine atom or a methyl group.

It will be appreciated that the novel ester of formula (I) includes naturally its optically active isomers which occur due to the asymmetric carbon atom possibly present in the carboxylic acid moiety such as d-trans-crysanthemum-monocarboxylic acid residue.

Among the esters represented by the formula (I), the especially useful ones that are not limitative in the present invention, are enumerated as follows:

| Compound No. | Structure |
|---|---|
| (1) | 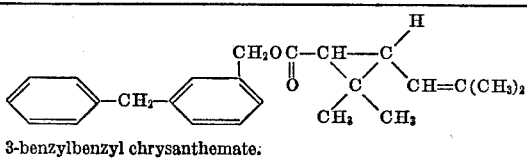 |
| | 3-benzylbenzyl chrysanthemate. |
| (2) | 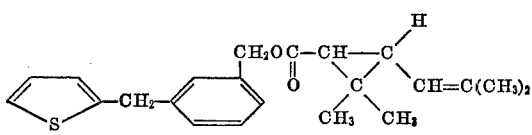 |
| | 3-thenylbenzyl chrysanthemate. |
| (3) | 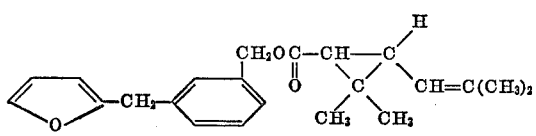 |
| | 3-furfurylbenzyl chrysanthemate. |

TABLE—Continued

| Compound No. | Structure |
|---|---|
| (4) | 3-pyrrolymethylbenzyl chrysanthemate. |
| (5) | 3-(m-xylyl)benzyl chrysanthemate. |
| (6) | 3-(p-xylyl)benzyl chrysanthemate. |
| (7) | 3-(o-xylyl)benzyl chrysanthemate. |
| (8) | 3-(5'-methylthenyl)benzyl chrysanthemate. |
| (9) | 3-(5'-methylfurfuryl)benzyl chrysanthemate. |
| (10) | 3-(5'-methylpyrrolyl)methylbenzyl chrysanthemate. |
| (11) | 3'-(o-chlorobenzyl)benzyl chrysanthemate. |
| (12) | 3-(5'-chlorothenyl)benzyl chrysanthemate. |

| Compound No. | Structure |
|---|---|
| (13) | 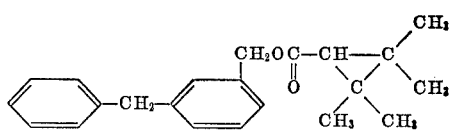 3'-benzylbenzyl 2,2,3,3-tetramethylcyclopropanecarboxylate. |
| (14) | 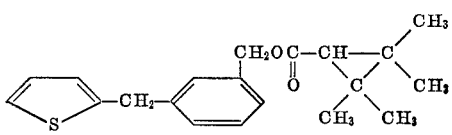 3'-thenylbenzyl 2,2,3,3-tetramethylcyclopropanecarboxylate. |
| (15) | 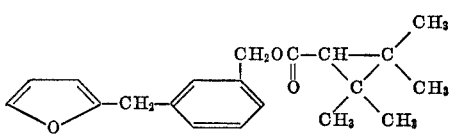 3'-furfurylbenzyl 2,2,3,3-tetramethylcyclopropanecarboxylate. |
| (16) | 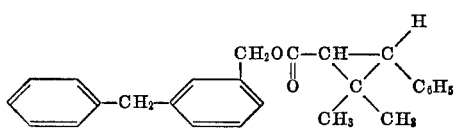 3'-benzylbenzyl 2,2-dimethyl-3-phenylcyclopropanecarboxylate. |
| (17) | 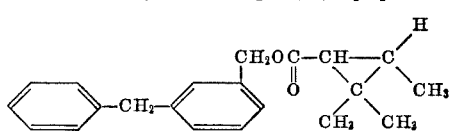 3'-benzylbenzyl 2,2,3-trimethyl-cyclopropanecarboxylate. |
| (18) | 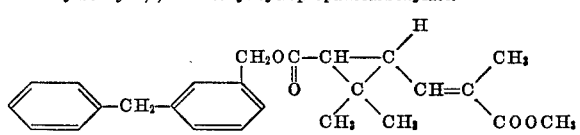 3-benzylbenzyl pyrethrate. |
| (19) | 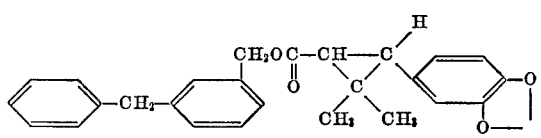 3'-benzylbenzyl 2,2-dimethyl-3-(3',4'-methylenedioxy)phenylcyclopropanecarboxylate. |
| (20) | 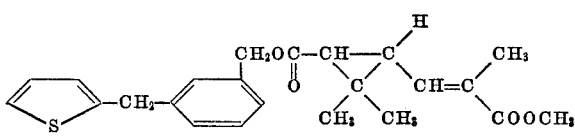 3-thenylbenzyl pyrethrate. |

Among the esters of the formula (I) of the present invention, the compound (1) above mentioned differs from known 4 - benzyl - benzyl chrysanthemum-carboxylate which is described in the article by Elliot et al. in the "Nature," vol. 207, pages 938–940 (1965) only in the position where the benzyl group attaches. However, as shown in the result of test for killing housefly, the compound of the present invention has more than 16 times activity as compared with the known compound, and more than 3 times with naturally origined phrethrin.

It will be appreciated that the present invention is doubtlessly useful from the following comparative data.

Killing effect of housefly (turn table method) [1]

| Compound | $LC_{50}$ mg./ 100 ml. | Ratio of effect |
|---|---|---|
| 3-benzylbenzyl chrysanthemate [the present compound (1)]. | 27 | 318. |
| 4-benzylbenzyl chrysanthemate [Elliot et al.: "Nature"]. | 450 | 19. |
| Pyrethrin | 87 | As 100. |

[1] See test example 1 hereinafter.

USE OF THE COMPOUND

The cyclopropanecarboxylate of formula (I) has an excellent activity for killing insects such as houseflies, mosquitoes, cockroaches and the like, and can be used not only in a wide scope of the prevention of epidemics but also controlling insects injurious to stored cereals, agriculture, especially crops before harvest, household horticulture, greenhouse cultivation and food-packaging, without anxiety due to its low toxicity.

PROCESS FOR PRODUCTION OF COMPOUND

The carboxylic acid ester of formula (I) is prepared for the first time by the present inventors, and is obtained easily and in good yield, for example, by a method comprising reacting a benzyl derivative of the formula,

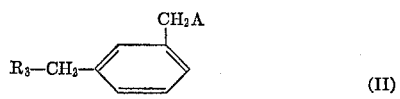

(II)

wherein $R_3$ is same as defined above, and A is a halogen atom or a hydroxy or tosyloxy group, with a cyclopropanecarboxylic acid of the formula,

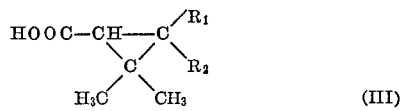

(III)

wherein $R_1$ and $R_2$ are same as defined above, or its reactive derivatives, in the presence of appropriate reaction-auxiliary agent, if necessary.

The benzyl derivative of formula (II) used in the method of the present invention is selected in such a relation of the other reactant, cyclopropanecarboxylic acid and its reactive derivatives of formula (III) as to enable it to be subjected to esterification. The reactive derivatives of the carboxylic acid of formula (III) mean corresponding acid halide, acid anhydride, lower alkyl ester or salt. The following disclosure will explain more particularly the method of the preparation of the cyclopropanecarboxylic acid ester of formula (I) according to the present invention.

The first embodiment of the method is to obtain the objective ester by reacting as the benzyl derivative an alcohol of the formula,

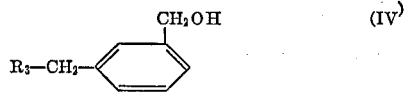

(IV)

wherein $R_3$ is same as defined abovee, with the cyclopropanecarboxylic acid of formula (III), halide, anhydride or lower alkyl ester thereof. When the acid itself is used, the reaction is completed under the condition of dehydration. Thus, the reaction is carried out by heating in the presence of dehydration catalyst such as mineral acids and paratoluene sulfonic acid or azeotropic solvent such as benzene and toluene. Alternatively, the reaction may be carried out in an inert solvent such as benzene, petroleum ether, containing a dehydrating agent such as dicyclohexylcarbodiimide with or without heating.

When the acid halide is used, the reaction is effected well at the room temperature in the presence of an organic tertiary amine such as pyridine, triethylamine and the like as a de-hydrogen halide agent. The acid halide used may be any ones, but acid chloride is usually used. In the reaction, the use of solvents is preferable to allow the reaction to proceed smoothly, and an inert solvent such as benzene, toluene and petroleum benzine is preferably used.

When the acid anhydride is used as the reactant, the reaction can proceed without any reaction-auxiliary agent well at the room temperature to form the objective ester of formula (I). The warming of the reaction system and the use of solvents are favourable for allowing reaction to proceed smoothly, but they are not always indispensable.

When the lower alkyl ester is used as the reactant, the reaction is completed in the presence of a basic catalyst such as sodium alkoxide under heating condition, and proceeds smoothly by the use of an inert solvent such as benzene, toluene and the like. The preferable lower alkyl ester used in the present method includes methyl ester, ethyl ester, n-propyl ester, iso-propyl ester and n-butyl ester, of the cyclopropanecarboxylic acid of formula (III).

The second embodiment of the process according to the present invention is to prepare the objective ester of formula (I) from 3-substituted-benzyl halides of the formula,

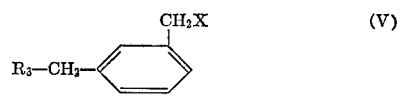

(V)

wherein X is a halogen atom, and $R_4$ is same as defined above. The another reactant is the salts of the carboxylic acid of formula (III) with alkali metals or tertiary amines, which salts may be formed in situ in the reaction by adding the corresponding bases forming such salts to the reaction mixture. The reaction is preferably carried out in the presence of an inert solvent such as benzene, acetone and the like at a temperature of the boiling point or the lower of the solvents for allowing the reaction to proceed. Among the halogen atoms represented by X in the formula (V), chloride or bromine atom is, in general, common, but other halogen atoms may be selected optionally.

The third embodiment of the method according to the present invention is to obtain the objective ester of formula (I) from 3-substituted benzyl tosylates of the formula,

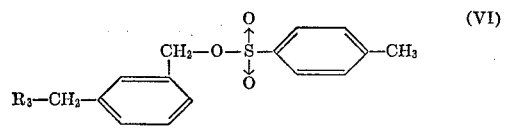

(VI)

wherein $R_3$ is same as defined above. In this case, the another reactant is those same as used in the second embodiment, and the reaction condition is also same as that used therein.

STARTING MATERIALS

The cyclopropanecarboxylic acids of formula (III) used as the reactant according to the present invention can be prepared by already known process, and, if necessary, may be converted to each of the reactive derivatives according to well known method. The 3-substituted-benzyl alcohols represented by formula (IV) are easily prepared by reducing corresponding carboxylic acid ester or ketone, and the 3-substituted-benzyl halides may be prepared with good yield by halogenating the corresponding 3-substituted-benzyl alcohols. The tosylates of formula (VI) may be also easily prepared by reacting the alcohols of formula (IV) with p-toluene sulfonyl chloride.

It will be appreciated that the carboxylic acid of formula (III) and its derivatives may include optically active isomers, such as d-trans-chrysanthemum-monocarboxylic acid and reactive derivatives thereof.

INSECTICIDAL COMPOSITION

In the preparation of insecticidal compositions, the new esters of formula (I) may be formulated into any desired forms of oil sprays, emulsifiable concentrates, dusts, wettable powders, aerosols, mosquito coils, fumigants, granules, baits and luring dust or solid preparation, according to known method in the art applied to the pyrethrum extracts, allethrin and the like, using auxiliary agents and/or carriers for common insecticidal compositions, although the solution of the ester in organic solvent such as xylene and methylnaphthalene is sometimes convenient.

The insecticidal compositions thus formed may be increased in its activity when used in admixture with a synergist for pyrethroid such as 3,4-methylenedioxy-6-propylbenzylbutyldiethylene glycolether (hereinafter referred to as "piperonylbutoxide"), 1,2-methylenedioxy-4-[2-(octylsulfinyl)propyl]-benzene (hereinafter referred to as "sulfoxide"), N-(2-ethylhexyl)-bicyclo[2,2,1]hepta-5-ene-2,3 - dicarboximide (hereinafter referred to as "MGK-264," registered trade name for said imide produced by McRolin Gormley King Co.), N-(4-pentynyl)-phthalimide or O-n-propyl-O - propargylphenyl phosphonate (hereinafter referred to NIA-16388). When the present compounds are formulated into mosquito coils, the activity can be increased by incorporation of a known additive therefor, such as terephthalic or isophthalic acid and butylhydroxytoluene (referred to as "BHT"). In addition, the present compounds may be formulated into multi-purpose compositions by incorporating other active ingredients such as pyrethroide, for example, pyrethrum extracts, allethrin, 3,4,5,6-tetrahydrophthalimidomethyl chrysanthemate (hereinafter referred to as "phthalthrin"), 5-benzyl-3-furylmethyl chrysanthemate; organic chloride insecticides, for example, dichlorodiphenyl-trichloromethane (referred to as "DDT"), benzene hexachloride (referred to as "BHC") and methoxychlor; organic phosphor insecticides, for example, O,O-dimethyl-O-(3-methyl-4-nitrophenyl) phosphorothioate (hereinafter referred to as "fenitrothion"), O,O-dimethyl-O-(2,2-dichloro-vinyl) phosphate (referred to as "DDVP"); carbamate type insecticides, for example, 1-naphtyl-N-methyl-carbamate and 3,4-xylyl-N-methylcarbamate; or other insecticides, fungicides, acaricides, herbicides, fertilizers or other agricultural chemicals.

The present invention will be more particularly illustrated by the following Examples which should not restrict the invention defined in the attached claims.

EXAMPLES 1-18

Production of the cyclopropanecarboxylic acid esters

The esters of the present invention shown in Table 1 were produced by standard processes each represented by A, B, C, D, E and F as follows:

Process A.—The reaction of the alcohol of the formula (IV) and the carboxylic acid halide In a solution of 0.05 mol. of the alcohol in 3 times by volume of dry benzene 0.075 mol. of pyridine are dissolved. To the solution, there is added a solution containing 0.053 mol. of the carboxylic acid chloride in its 3 times by volume of dry benzene at a time to react under generation of heat. After allowed to stand over a night with sealing, the reaction mixture is added with a slight amount of water to dissolve pyridine hydrochloride precipitation, and the aqueous layer formed is removed. The organic layer is successively washed with an aqueous solution containing 5 percent by weight of hydrochloric acid and a saturated aqueous solution of sodium hydrogencarbonate, and saturated sodium chloride and dried over anhydrous sodium sulfate, and distilled to remove benzene. The residual liquid is subjected to silicagel chromatography to recover the purified objective ester in the form of a pale yellow oil.

Process B.—The dehydration reaction between the alcohol of formula (IV) and the carboxylic acid of formula (III):

To a solution of 0.05 mol. each of the alcohol and the carboxylic acid in 3 times by volume of benzene, 0.08 mol. of dicyclohexylcarbodiimide is added while stirring, and the reaction mixture is allowed to stand over a night, with tightly sealing. Next day, the reaction is completed by refluxing for 2 hours, and then the objective ester is recovered by the procedures same as described in Process A.

Process C.—The reaction of the alcohol of formula (IV) and the carboxylic acid anhydride:

To a solution of 0.05 mol. of the alcohol in 3 times by volume of toluene, 0.06 mol. of the carboxylic acid anhydride prepared by reaction of the carboxylic acid of formula (III) and acetic anhydride is added, and heated at 100° C. for 3 hours to complete the reaction. After cooled, the reaction mixture is neutralized with 10 percent aqueous solution of sodium hydroxide at a temperature of not higher than 10° C., and the carboxylic acid resulted from the excess of the anhydride is recovered as sodium salt thereof from the aqueous layer. The organic layer is treated by the procedure same as described in Process A, and the objective ester is thus obtained.

Process D.—The trans-esterification reaction between the alcohol of formula (IV) and the lower alkyl ester of the carboxylic acid:

To a solution of 0.06 mol. of ethyl ester of the carboxylic acid of formula (III) and 0.05 mol. of the alcohol in 5 times by volume of dried toluene, 0.005 mol. of sodium ethoxide is added. The reaction system is well stirred and refluxed for 10 hours to complete the reaction, while removing the formed ethanol as azeotropic mixture from the top of the rectification column. After adding water carefully, the objective ester is recovered from the organic layer by the procedures same as described in Process A.

Process E.—The reaction of the halide of formula (V) and the carboxylic acid of formula (III)

A solution of 0.05 mol. of the halide and 0.06 mol. of the carboxylic acid in 3 times by volume of acetone is warmed at 15° to 20° C., and is added dropwise with a solution of 0.08 mol. of triethylamine in 3 times by volume of acetone over a time of 1 hour while stirring. After the addition, the reaction system is refluxed for 2 hours to complete the reaction and cooled. The precipitating triethylamine hydrochloride is filtered off. The filtrate is distilled to remove acetone. 3 times by volume of benzene is added to the remaining liquid. The organic layer is treated by the procedures same as described in Process A, and the objective ester is recovered.

Process F.—The reaction of the tosylate of formula (VI) and salt of the carboxylic acid of formula (III)

To a solution of 0.05 mol. of the tosylate in 3 times by volume of acetone, 0.06 mol. of the sodium carboxylate which has been prepared by reacting the carboxylic acid and sodium hydroxide in water and distilling off water to obtain a dry mass, is added at a room temperature over a time of 30 minutes while stirring. The reaction system is refluxed for 30 minutes to complete the reaction, and cooled. A precipitation formed is filtered off, and the filtrate is distilled to remove the acetone. The remainings is dissolved in 3 times by volumes of benzene, and the objective ester is recovered from the organic liquid by the procedures as described in Process A.

According to the above-mentioned standard process, resulting esters are each shown in the following Table 1 from the starting materials which are also shown therein.

TABLE 1

| Example No. | Starting materials — Benzyl derivative | Starting materials — Cyclopropane-carboxylic acid | Process | Compound | Yield, percent | Refractive index ($n_D^{25}$) | Elementary analysis (percent) C | H | Cl | |
|---|---|---|---|---|---|---|---|---|---|---|
| 1 | 3-benzyl-benzyl bromide. | Dl-trans-chrysanthemum-monocarboxylic acid. | E | 3-benzyl-benzyl chrysanthemate. | 87 | 1.5475 | Found 82.4 Calculated 82.7 | 8.33 8.10 | | (As $C_{24}H_{28}O_2$) |
| 2 | 3-thenyl-benzyl alcohol. | Dl-cis-trans-chrysanthemum-monocarboxylic acid chloride. | A | 3-thenyl-benzyl chrysanthemate. | 89 | 1.5532 | Found 74.7 Calculated 74.6 | 7.45 7.39 | | (As $C_{22}H_{26}O_2S$) |
| 3 | 3-furfuryl-benzyl alcohol. | ----do---- | A | 3-furfuryl-benzyl chrysanthemate. | 91 | 1.5264 | Found 78.0 Calculated 78.1 | 7.78 7.74 | | (As $C_{22}H_{28}O_3$) |
| 4 | 3-(2′-pyrrolyl-methyl) benzyl alcohol. | ----do---- | A | 3-(2′-pyrrolyl-methyl) benzyl chrysanthemate. | 87 | 1.5482 | Found 78.2 Calculated 78.3 | 8.11 8.01 | | (As $C_{22}H_{27}NO_2$) |
| 5 | 3-(m-xylyl)-benzyl alcohol. | Dl-cis, trans-chrysanthemum-monocarboxylic acid. | B | 3-(m-xylyl)-benzyl chrysanthemate. | 85 | 1.5450 | Found 81.0 Calculated 80.8 | 8.49 8.34 | | (As $C_{25}H_{30}O_2$) |
| 6 | 3-(p-xylyl)-benzyl alcohol. | Dl-cis, trans-chrysanthemum-monocarboxylic acid anhydride. | C | 3-(p-xylyl)-benzyl chrysanthemate. | 92 | 1.5462 | Found 80.9 Calculated 80.8 | 8.51 8.34 | | (As $C_{25}H_{30}O_2$) |
| 7 | 3-(o-xylyl)-benzyl alcohol. | Dl-cis, trans-chrysanthemum-monocarboxylic acid chloride. | A | 3-(o-xylyl)-benzyl chrysanthemate. | 90 | 1.5470 | Found 80.6 Calculated 80.8 | 8.44 8.34 | | (As $C_{25}H_{30}O_2$) |
| 8 | 3-(5′-methyl-thenyl)-benzyl alcohol. | ----do---- | A | 3-(5′-methyl-thenyl)-benzyl chrysanthemate. | 87 | 1.5515 | Found 74.9 Calculated 75.0 | 7.70 7.66 | | (As $C_{23}H_{28}O_2S$) |
| 9 | 3-(5′-methyl-furfuryl)-benzyl alcohol. | ----do---- | A | 3-(5′-methyl-furfuryl)-benzyl chrysanthemate. | 91 | 1.5248 | Found 78.3 Calculated 78.4 | 8.20 8.01 | | (As $C_{23}H_{28}O_3$) |
| 10 | 3-(o-chloro-benzyl)-benzyl tosylate. | Sodium dl-cis, trans-chrysanthemum-monocarboxylate. | F | 3-(o-chloro-benzyl) benzyl chrysanthemate. | 84 | 1.5522 | Found 75.2 Calculated 75.3 | 7.21 7.06 | 9.56 9.28 | (As $C_{24}H_{27}ClO_2$) |
| 11 | 3-benzyl-benzyl alcohol. | Ethyl 2,2,3,3-tetramethyl-cyclopropane-carboxylate. | F | 3′-benzyl-benzyl 2,2,3,3-tetramethyl-cyclopropane-carboxylate. | 80 | 1.5426 | Found 81.8 Calculated 82.0 | 8.15 8.13 | | (As $C_{22}H_{26}O_2$) |
| 12 | 3-thenyl-benzyl alcohol. | 2,2,3,3-tetramethylcyclopropane-carboxylic acid chloride. | A | 3′-thenyl-benzyl 2,2,3,3-tetramethyl-cyclopropane-carboxylate. | 87 | 1.5502 | Found 73.0 Calculated 73.1 | 7.45 7.37 | | (As $C_{20}H_{24}O_2S$) |
| 13 | 3-furfuryl-benzyl alcohol. | ----do---- | A | 3′-furfuryl-benzyl 2,2,3,3-tetramethyl-cyclopropane-carboxylate. | 90 | 1.5228 | Found 76.7 Calculated 76.9 | 7.81 7.74 | | (As $C_{20}H_{24}O_3$) |
| 14 | 3-benzylbenzyl alcohol | Dl-cis, trans-2,2-dimethyl-3-phenyl-cyclopropane-carboxylic acid chloride. | A | 3′-benzylbenzyl 2,2-dimethyl-3-phenyl-cyclopropane-carboxylate. | 91 | 1.5824 | Found 84.1 Calculated 84.3 | 7.13 7.07 | | (As $C_{26}H_{26}O_2$) |
| 15 | ----do---- | Dl-cis, trans-2,2,3-trimethylcyclopropane-carboxylic acid chloride. | A | 3′-benzylbenzyl 2,2,3-trimethylcyclopropane-carboxylate. | 91 | 1.5450 | Found 81.5 Calculated 81.8 | 7.92 7.84 | | (As $C_{21}H_{24}O_2$) |
| 16 | ----do---- | Dl-trans, trans-pyrethric acid. | B | 3-benzylbenzyl pyrethrate. | 86 | 1.5610 | Found 76.3 Calculated 76.5 | 7.27 7.19 | | (As $C_{25}H_{28}O_4$) |
| 17 | ----do---- | Dl-cis, trans-2,2-dimethyl-3-(3′,4′-methylene-dioxy)phenyl-cyclopropane-carboxylic acid chloride. | A | 3′-benzylbenzyl 2,2-dimethyl-3-(3′,4′-methylene-dioxyphenyl) cyclopropane-carboxylate. | 88 | 1.5878 | Found 78.0 Calculated 78.2 | 6.50 6.32 | | (As $C_{27}H_{26}O_4$) |
| 18 | ----do---- | D-trans-crysanthemum-monocarboxylic acid chloride. | A | 3-benzylbenzyl-d-trans-crysanthemate. | 90 | [1] 1.5468 | Found 82.8 Calculated 82.7 | 8.15 8.10 | | (As $C_{24}H_{28}O_2$) |

[1] $[\alpha]_D^{21}$ −11.33 (chloroform).

Preparation of insecticidal composition and test data thereof

The esters used is represented by the compound number previously mentioned, and parts is by weight.

EXAMPLE 19

0.05 part of the present compounds (1) was dissolved in kerosene to make 100 parts. An oil spray was thus obtained.

EXAMPLE 20

0.1 part of the present compounds (2), (3) and (5), respectively, was dissolved in kerosene to make 100 parts. Thus, three oil sprays were obtained, respectively.

EXAMPLE 21

0.1 part of the present compounds (4) and (17), respectively, and 0.4 part of piperonylbutoxide were dissolved in kerosene to make 100 parts. Two oil sprays were thus obtained, respectively.

EXAMPLE 22

0.1 part of the present compounds (6) and (8), respectively, and 0.4 part of sulfoxide were dissolved in kerosene to make 100 parts. Two oil sprays were thus obtained, respectively.

EXAMPLE 23

0.1 part of the present compound (9) and 0.4 part of MGK-264 were dissolved in kerosene to make 100 parts. An oil spray was thus obtained.

EXAMPLE 24

0.1 part of the present compound (10) and 0.1 part of phenitrothion were dissolved in kerosene to make 100 parts, whereby an oil spray was obtained.

EXAMPLE 25

0.1 part of the present compound (16) and 0.1 part of DDVP were dissolved in kerosene to make 100 parts, whereby an oil spray was obtained.

EXAMPLE 26

20 parts of the present compounds (1), (2), (4), (6), (7), (9), (10), (11), (12), (14), (16), (18) and (20), respectively, 10 parts of Sorpol SM-200 (registered trade name for an emulsifier sold by Toho Chemical Co.) and 70 parts of xylene were mixed well under stirring. Twelve emulsifiable concentrates each containing 20 percent by weight of the present compound were thus obtained, respectively.

EXAMPLE 27

0.8 part of the present compounds (13) and (15), respectively, was dissolved in 20 ml. of methanol. The solutions were homogeneously mixed with 99.2 g. of a mosquito coil carrier consisting of a mixture of Tabu powder, Pyrethrum marc and wood powder in the ratio of 3:5:1, and methanol was evaporated. The remainings were added with 150 ml. of water, kneaded thoroughly, and shaped into mosquito coils and dried. Thus, 2 mosquito coils each containing 0.8 percent of the active compound were thus obtained, respectively.

EXAMPLE 28

0.2 part of the present compound (1), 0.2 part of phthalthrin were dissolved in a mixture of 7 parts of xylene and 7.6 parts of purified kerosene. The solution was filled in an aerosol container. After attaching a valve-portion to the container, 85 parts of a propellant (liquefied petroleum gas) were filled in the container under pressure. An aerosol was thus obtained.

EXAMPLE 29

0.3 part of the present compounds (13), (15), (18) and (20), respectively, and 0.3 part of phenitrothion were dissolved in a mixture of 7 parts of xylene and 7.4 parts of purified kerosene, and the solution was filled with the propellant by the procedure of Example 28. Thus, four aerosols were obtained, respectively.

EXAMPLE 30

0.2 part of the present compound (3), 0.2 part of tetramethrin, 13.6 parts of purified kerosene and 1 part of Atmos 300 (a registered trade name for an emulsifier sold by Atras Chemical Co.) were mixed, and added with 50 parts of pure water. The mixture was filled in an aerosol container together with 35 parts of a mixture of deodorized propane and butane in a ratio of 1:3. A water-based aerosol was thus obtained.

EXAMPLE 31

99 parts of 300 mesh diatomaceous earth were added to a solution of 1 part of the present compounds (1), (13) and (14), respectively, in 20 parts of acetone. The mixtures were thoroughly mixed by means of a mortar, and acetone was evaporated. Three dust preparations were thus obtained, respectively.

EXAMPLE 32

1.5 g. of the present compounds (17) and (19), respectively, were dissolved in 20 ml. of methanol. The solution was mixed homogeneously with 98.5 g. of the mosquito coils carrier as in Example 27, and added with 150 ml. of water and well kneaded. The mixture was shaped into mosquito coil and dried. Two mosquito coils each containing 1.5% of active ingredients were thus obtained, respectively.

EXAMPLE 33

5 parts of the present compound (2), 5 parts of Toyo-lignin CT (an excipient, registered trade name sold by Toyo Boseki Co.) and 90 parts of GSM Clay (a registered trade name for Clay sold by Zieklite Mining Co.) are thoroughly mixed by means of a mortar. Then, the mixture was added with 10 percent by weight of water of basing on the weight of the mixture, and further mixed well. The thus obtained mixture was granulated by means of a granulator and air-dried. A granular preparation was thus obtained.

EXAMPLE 34

To a uniform mixture of 25 parts of the present compound (8) and 5 parts of Sorpol SM-200, 70 parts of 300 mesh talc were added and thoroughly mixed by means of a mortar. A wettable powder was thus obtained.

The insecticidal effects of the present compositions thus prepared is shown in the following test examples.

TEST EXAMPLE 1

The oil sprays obtained according to Examples (19) to (25), respectively, and a 0.2% allethrin oil spray as control, were individually sprayed in an amount of 5 ml., using Campbel's turn table apparatus ["Soap and Sanitary Chemicals," Vol. 14, No. 6, *119* (1938)].

After 20 seconds from the spray, the shutter was opened, and housefly adults (about 100 flies per group) were exposed to the mist for 10 minutes and were then transferred to an observation cage. In the cage, the flies were fed and were allowed to stand for one day at room temperature. Thereafter, the number of killed flies was counted to calculate the mortality thereof. The results were as shown in Table 2.

TABLE 2

| Composition (oil spray) | Mortality (percent) |
|---|---|
| Example 19 [containing 0.05% of compound (1)] | 87 |
| Example 20 [containing 0.1% of compound (2)] | 84 |
| Example 20 [containing 0.1% of compound (3)] | 90 |
| Example 20 [containing 0.1% of compound (5)] | 74 |
| Example 21 [containing 0.1% of compound (4) and 0.4% of piperonylbutoxide] | 84 |
| Example 21 [containing 0.1% of compound (17) and 0.4% of piperonylbutoxide] | 92 |
| Example 22 [containing 0.1% of compound (6) and 0.4% of sulfoxide] | 85 |
| Example 22 [containing 0.1% of compound (8) and 0.4% of Sulfoxide] | 80 |
| Example 23 [containing 0.1% of compound (9) and 0.4% of MGK-264] | 82 |
| Example 24 [containing 0.1% of compound (10) and 0.1% of phenitrothion] | 100 |
| Example 25 [containing 0.1% of compound (16) and 0.1% of DDVP] | 98 |
| Allethrin 0.2% oil spray | 82 |

TEST EXAMPLE 2

The insecticidal effects on housefly adults of the aerosols formulated according to Examples 28, 29 and 30 were tested by the aerosol test method using Peet Grady's chamber [the method disclosed in "Soap and Chemical Specialties, Blue Book." (1965)]. The results were as shown in Table 3.

TABLE 3

| Composition (aerosol) | Sprayed amount (g./1,000 ft.³) | Knock-down ratio (percent) | | | Mortality (percent) |
|---|---|---|---|---|---|
| | | 5 min. | 10 min. | 15 min. | |
| Example 28 | 3.24 | 17 | 45 | 74 | 51 |
| Example 29 [containing compound (13)] | 3.33 | 5 | 39 | 87 | 69 |
| Example 29 [containing compound (15)] | 3.33 | 1 | 24 | 78 | 71 |
| Example 29 [containing compound (18)] | 3.24 | 5 | 30 | 81 | 61 |
| Example 29 [containing compound (20)] | 3.01 | 4 | 28 | 83 | 72 |
| Example 30 [water-based aerosol] | 3.32 | 9 | 39 | 81 | 67 |

TEST EXAMPLE 3

About 20 northern house mosquito adults were liberated in a 70 cm.³ glass chamber. Each 1 g. of the mosquito coils formulated according to Examples 27 and 32, were ignited on both ends and were individually placed at the center in the chamber. The number of knocked-down insects were counted with lapse of time to after 20 minutes and the knock-down percentages were calculated as more than 80 percent in each test.

TEST EXAMPLE 4

The emulsifiable concentrate formulated according to Example 26 and wettable powder of Example 34 were individually diluted with water to 50,000 times. Each 1.5 liters of the thus prepared test emulsions were individually charged in a styrol case of 23 cm. x 30 cm. with a depth of 6 cm. Into the case, about 100 larvae of northern house mosquitoes were liberated, whereby 90% or more of the larvae could be killed on the next day.

TEST EXAMPLE 5

10 liters of water was poured into a 14 liters polypropylene bucket. Into the water, the granular preparation formulated according to Example 33 was charged in an amount of 1 g. After one day, 100 full grown northern house mosquito larvae were liberated in the water, whereby more than 90 percent of the larvae could be killed within 24 hours.

TEST EXAMPLE 6

A glass Petri dish of 14 cm. in inner diameter and 7 cm. in height was coated on the inner wall with butter, leaving at the lower part an uncoated portion of 1 cm. in width. Onto the bottom of the dish, the dusts each containing the compounds (13) and (14) formulated according to Example 31 were uniformly dusted individually in a proportion of 2 g./m.². Subsequently, 10 German cockroach adults were liberated in the dish and were contacted with the individual dusts for 30 minutes. After 3 days, more than 90% of the cockroaches were killed.

TEST EXAMPLE 7

In 1/50,000 Wagner pots were grown rice plants which had elapsed 45 days after sowing. The emulsifiable concentrate each containing the compound (1), (2), (9) and (18) obtained according to Example 26 were diluted individually with water to 500 times. The thus prepared test solutions were individually sprayed outs the rice plants in a proportion of 10 ml. per pot, and each pot was covered with wire net. Into the net, 30 adults of green rice leaf hoppers were liberated. After 24 hours, more than 90 percent of the hoppers could be killed.

What we claim is:

1. A 3-substituted-benzyl cyclopropanecarboxylate represented by the formula,

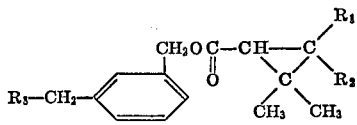

wherein $R_1$ is a hydrogen atom or a methyl group; $R_2$ is methyl, 2-methyl-1-propenyl, 2-methoxycarbonyl-1-propenyl or phenyl when $R_1$ is a hydrogen, or methyl group when $R_1$ is a methyl group; and $R_3$ is a phenyl group which may be substituted by a chlorine atom or a methyl group.

2. A 3-substituted-benzyl cyclopropanecarboxylate according to claim 1, wherein $R_1$ is hydrogen atom and $R_2$ is 2-methyl-1-propenyl.

3. A 3-substituted-benzyl cyclopropanecarboxylate according to claim 1, wherein $R_1$ and $R_2$ are each methyl.

4. 3-Benzylbenzyl chrysanthemate.

5. A 3-substituted-benzyl cyclopropanecarboxylate according to claim 3 wherein $R_3$ is phenyl.

References Cited
UNITED STATES PATENTS
3,636,059   1/1972   Matsui et al. _____ 260—347.4

FOREIGN PATENTS
1,439,914   5/1967   France _____ 260—468

ROBERT GERSTL, Primary Examiner

U.S. Cl. X.R.

260—326.3, 326.5 R, 326.8, 326.82, 329 S, 332 R, 332.3 R, 332 S, 340 S, 396.1 R, 347.2, 347.4, 347.8, 456 P, 464; 424—275, 282, 285, 306